April 20, 1926.

L. BRENNEIS 1,581,165

WHEEL CONSTRUCTION

Filed Jan. 2, 1925

INVENTOR
LOUIS BRENNEIS.
BY
ATTORNEY

Patented Apr. 20, 1926.

1,581,165

UNITED STATES PATENT OFFICE.

LOUIS BRENNEIS, OF OXNARD, CALIFORNIA, ASSIGNOR TO BRENNEIS MANUFACTURING COMPANY, OF OXNARD, CALIFORNIA, A CORPORATION OF CALIFORNIA.

WHEEL CONSTRUCTION.

Application filed January 2, 1925. Serial No. 114.

*To all whom it may concern:*

Be it known that I, LOUIS BRENNEIS, a citizen of the United States, residing at Oxnard, in the county of Ventura, State of California, have invented a new and useful Wheel Construction, of which the following is a specification.

This invention relates to devices adapted for attachment to a wheel for providing traction between the wheel and a surface on which the wheel is traveling.

My invention is useful on any wheel where a tractive engagement is necessary, and it is especially valuable when used upon wheeled farm vehicles. On farm vehicles, it is necessary to provide grousers to prevent slippage. These grousers are generally in the form of members providing ridges which are attached to the periphery of the wheel. These ridges imbed in the surface of the ground as the wheel rotates and supply the necessary traction. When the vehicle is drawn over a hard surface such as a road, the ridges of the grousers cause the vehicle to bump, which results in a considerable destructive jar to the vehicle, and also causes injury to the road.

It is an object of this invention to provide a grouser which will provide traction, but will not cause bumping on hard surfaces. To accomplish this, I provide grouser members which are arranged on the periphery of a wheel in such a manner as to provide a continuous circular engagement with the surface over which it is passing.

It is another object of the invention to provide a grouser of this character which may readily be secured to a wheel.

It is a still further object of the invention to provide a means for preventing lateral movement of the grouser.

Other objects and advantages of my invention will appear in the following description.

Referring to the drawing which is for illustrative purposes only,

Figure 1:
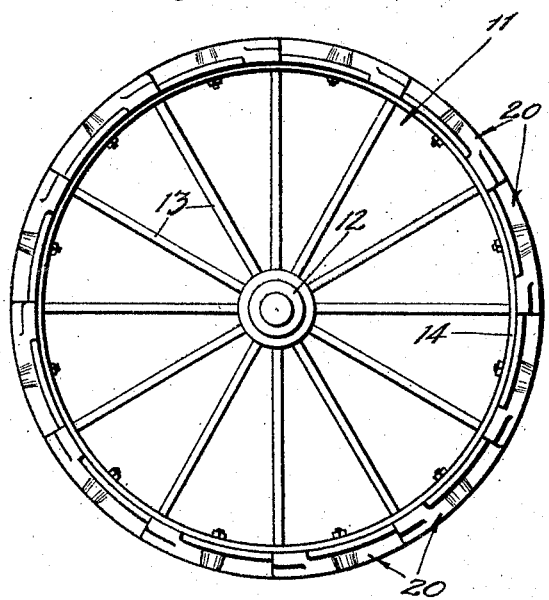
Fig. 1 is a face view of a wheel construction having grousers of my invention secured on the rim thereof.

As shown in the drawings, 11 indicates a wheel having a hub 12 from which there extend spokes 13. These spokes 13 extend radially outward from the hub 12 and have a rim 14 secured at the outer ends thereof. In the drawings I show the rim 14 as being slightly dished or arcuated so as to provide a curved cylindrical face 15. On the rim 14 is secured a number of grousers 20, these grousers incorporating the features of my invention.

Each grouser 20 consists of a central truncated conical portion 21 having an opening 22 therethrough through which a rivet head bolt 23 extends, this bolt 23 extending through an opening 24 in the rim 14 and having a nut 26 threaded on the end thereof for securing the grouser 20 in place. Diametrically opposed arms 28 and 29 extend from the central portion 21, these arms being curved as shown, so that the grouser is substantially a reversed S-shape. From Fig. 2, it will be noticed that the arms or extensions 28 and 29 extend in a direction which is diagonal with respect to the direction of travel of the wheel 11. The ends 31 of the arms 28 and 29 are curved so as to extend substantially parallel with the edges 32 of the rim 14. The lower face 34, that is, the face of the grouser, which engages with the face 15 of the rim 14, is of such a shape as to engage this face 15 at all points. The outer face 35 of the grouser is of a shape that it provides an arcuated surface having the axis of the wheel as its center. At the ends 31 of of arms 28 and 29 I provide lips 37 which extend inwardly toward the hub of the wheel 11 engaging the edges 32 of the rim 14, as clearly shown in Fig. 3 of the drawings. The lips 37 are provided for preventing the grouser 20 from swinging on the central bolt 23. It is obvious that the curvature of the rim 14 prevents the arms 28 and 29 from swinging outwardly owing to the fact that the pressure of engagement increases if a rotative pressure is applied on the grouser in this direction. The grousers would be free to rotate in the other direction, that is, so that the arms 28 and 29 align with the direction of travel of the wheel if it were not for the provision of the lips 37 which prevent this movement.

Figure 2:
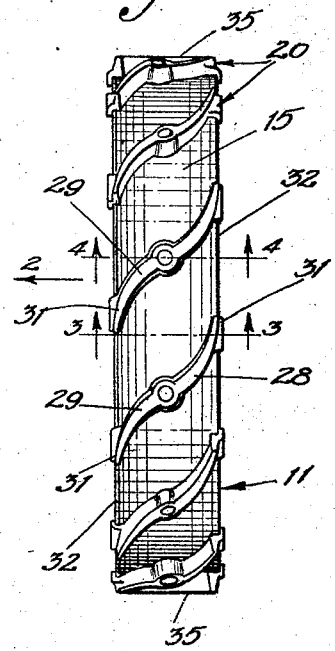
Fig. 2 is an edge view of a wheel with a plurality of my grousers attached thereto, a direction of said view being indicated by the arrow 2 of Fig. 1.
Figure 3:
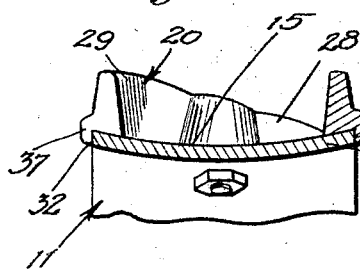
Fig. 3 is a section taken as indicated by the line 3—3 of Fig. 2.
Figure 4:
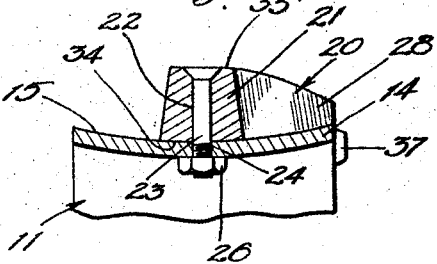
Fig. 4 is a section taken as indicated by the line 4—4 of Fig. 2.

As shown in Figs. 1 and 2, a number of grousers 20 are secured on the rim of the wheel 11 in the manner just described. These grousers are secured, however, so that the arms 28 extend along the rim 14 and so that the ends 31 thereof overlap relative to the ends 31 of the arms 29. This manner of mounting the grousers provides a complete circular engagement with the surface on which the wheel is traveling, this being clearly shown in Fig. 1.

When the wheel is traveling over a soft surface the grousers 20 imbed in this surface and provide traction for the wheel preventing a slippage thereof. When the wheel is traveling over a hard surface, the faces 35 of the grousers 20 co-operate to provide a continuous circular face, a portion of which circular face will engage the hard surface at all times. It will be seen that by the provision of a continuous circular engagement, all bumping in the wheel is entirely prevented and a destructive jar to the vehicle is eliminated. Further, this provision does away with injury to roads. My grousers are of such a construction that they may be very economically cast and may be made sturdy in construction. The securing means shown is very simple and the grouser may be readily attached to the rim of a wheel. All motion in the grouser relative to the rim 14 of the wheel is prevented by the lips 37 which engage the edges 32 of the rim, as illustrated in the drawing.

I claim as my invention:

1. In combination: a wheel having a rim; and grousers for giving traction to said wheel, each of said grousers comprising a central enlarged portion through which a bolt extends to secure said grouser to the outer face of said rim, curved arms extending symmetrically from said central portion in substantially opposite directions and diagonally with respect to the axis of rotation of said wheel, the ends of said arms overlapping with the arms of adjacent grousers in a manner to provide an unbroken rolling engagement with a surface, and lips formed on the ends of said arms, said lips engaging the edges of said rim, thus preventing lateral movement of said grouser.

2. A grouser for wheels, comprising: a central portion having a bolt opening therethrough; and diametrically oppositely disposed curved extensions arranged to fit the contour of a wheel rim when placed thereon in diagonal position, the outer cylindrical faces of said central portion and said extensions providing an unbroken rolling engagement with a surface when a number of said grousers are placed on said rim in overlapping relation.

3. In combination: a wheel having a rim, said rim having a periphery concave in cross section; and grousers for giving traction to said wheel, each of said grousers comprising a central enlarged portion through which a bolt extends to secure said grouser to the outer face of said rim, curved arms extending symmetrically from said central portion in substantially opposite directions and diagonally with respect to the axis of rotation of said wheel, the ends of said arms overlapping with the arms of adjacent grousers in a manner to provide an unbroken rolling engagement with a surface, and lips formed on the ends of said arms, said lips engaging the edges of said rim, thus preventing lateral movement of said grouser, said grouser being formed on its underside to engage the surface of said rim along its entire extension thereon.

In testimony whereof, I have hereunto set my hand at Oxnard, California, this 24th day of December, 1924.

LOUIS BRENNEIS.